United States Patent [19]

Kopp et al.

[11] Patent Number: 4,945,120

[45] Date of Patent: Jul. 31, 1990

[54] PROCESS FOR THE PRODUCTION OF POLYURETHANE FOAMS USING STERICALLY HINDERED AROMATIC DIAMINES

[76] Inventors: Richard Kopp; Günter Oertel; Eckehard Weigand; Rolf Wiedermann, all of Bayer AG, D 5090, Leverkusen, Fed. Rep. of Germany

[21] Appl. No.: 355,943

[22] Filed: May 23, 1989

[30] Foreign Application Priority Data

Sep. 15, 1984 [DE] Fed. Rep. of Germany ....... 3433979

[51] Int. Cl.$^5$ .................. C08G 18/00; C08G 18/14
[52] U.S. Cl. ................................. 521/163; 521/167; 521/904
[58] Field of Search ................... 521/163, 167, 904

[56] References Cited

U.S. PATENT DOCUMENTS

| | | | |
|---|---|---|---|
| 3,428,610 | 2/1969 | Klebert | 528/64 |
| 3,583,926 | 6/1971 | Zwolinski et al. | 252/182 |
| 3,984,360 | 10/1976 | Galbreath et al. | 521/167 |
| 4,218,543 | 8/1980 | Webber et al. | 521/51 |
| 4,374,222 | 2/1983 | Meyer | 524/241 |
| 4,381,353 | 4/1983 | McDaniel | 521/131 |
| 4,418,160 | 11/1983 | Rasshofer | 521/163 |
| 4,433,067 | 2/1984 | Rice et al. | 521/51 |
| 4,442,235 | 4/1984 | Taylor et al. | 521/163 |
| 4,459,399 | 7/1984 | Ihrman et al. | 528/64 |
| 4,523,004 | 6/1985 | Lin et al. | 528/76 |
| 4,526,905 | 7/1985 | Lucast et al. | 521/163 |
| 4,529,746 | 7/1985 | Markous et al. | 521/163 |

FOREIGN PATENT DOCUMENTS 685700 1/1967 Belgium .

*Primary Examiner*—John Kight, III
*Assistant Examiner*—Dennis R. Daley

[57] ABSTRACT

The present invention is directed to the production of free-rise polyurethane foams using sterically hindered diamines of the formula (e)

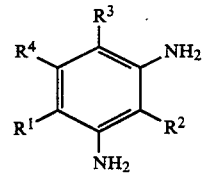

and/or

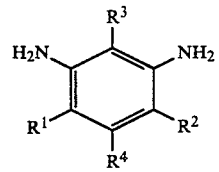

in which
$R^1$ and $R^2$ may be the same or different and represent $C_1$-$C_4$-alkyl and
$R^3$ and $R^4$ may again be the same or different and represent H or $CH_3$, is added to said reaction mixture.

13 Claims, No Drawings

PROCESS FOR THE PRODUCTION OF POLYURETHANE FOAMS USING STERICALLY HINDERED AROMATIC DIAMINES

This application is a continuation of application Ser. No. 771,539 filed Aug. 30, 1985, now abandoned.

BACKGROUND OF THE INVENTION

The use of sterically hindered aromatic diamines in the production of molded microcellular polyurethanes and molded polyurethane foams is known (German Offenlegungsschrift No. 2,622,951, U.S. Pat. Nos. 3,583,926, 4,218,543 and 4,374,222). By contrast, the present invention relates to the use of sterically hindered aromatic diamines in the production of free-rise polyurethane foams, particularly in the production of so-called spray foams (i.e., on site foam produced by spraying, cf. DIN 18159, Part 1, Section 3.2). Tough, rigid polyurethane foams, particularly spray foams, are obtained in accordance with the invention, which foams satisfy the requirements of Group B2 building materials as laid down in DIN 4102 and show firm adhesion to the surface.

Spray polyurethane foams which satisfy the requirements of Group B2 building materials as laid down in DIN 4102 are known as insulating materials in the building industry. In the spraying process, a highly active reaction mixture (in finely dispersed form under air or liquid pressure) is sprayed through the nozzles of a mixhead onto a surface that is to be insulated, where the mixture immediately begins to foam and hardens as a foam. The processing of spray foams, on site, is very seriously affected by inclement weather, resulting in significant economic losses. One of the most serious disadvantages of known spray foam systems lies in the fact that they can only be used at ambient temperatures above 10° C. The effect of excessively low temperatures of the surface to be insulated is that too much heat of reaction is transferred from the first layer of the foamable polyurethane reaction mixture sprayed on the surface. This results not only in an increased gross density, but also embrittlement of the foam through incomplete reaction which can leave the surface of the foam which contacts the substrate to be insulated with a "sandy" appearance. The brittleness of the bottom surface of the foam is the reason for loss of the favorable adhesion properties to the substrate which the foam system shows when processed on substrate materials which are at too low a temperature.

The object of the present invention is to provide a polyurethane foam system which may be used with advantage, in particular by the spray process, and which avoids the disadvantages described above. It has surprisingly been found that it is possible to obviate the above-mentioned disadvantages by using certain sterically hindered aromatic diamines in the production of polyurethane foams, particularly by the spray process, i.e., in particular in the production of sprayed polyurethane foams. The sprayed foams obtainable in accordance with the invention surprisingly show firm adhesion to the substrate at temperatures as low as about 5° C. without any deterioration in their burning behavior and other properties.

DESCRIPTION OF THE INVENTION

The present invention is thus directed to a process for the production of a free-rise polyurethane foam by reacting (i) an organic polyisocyanate and (ii) a compound containing at least two isocyanate reactive hydrogen atoms and having a molecular weight from 400 to 10,000 in the presence of (iii) water and/or an organic blowing agent, and allowing the reaction mixture to foam, the improvement wherein sterically hindered aromatic diamines corresponding to the following formula(e)

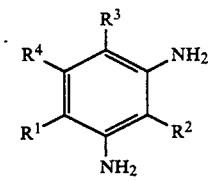

and/or

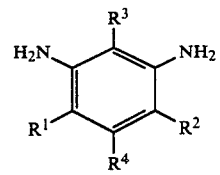

in which
$R^1$ and $R^2$ may be the same or different and represent $C_1$-$C_4$-alkyl and
$R^3$ and $R^4$ may be the same or different and represent H or $CH_3$, are included in the reaction mixture.

According to the invention, the sterically hindered aromatic diamines preferably used are those corresponding to the following formula(e)

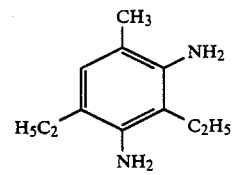

and/or

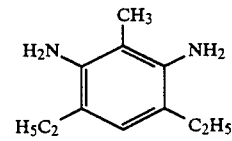

It is particularly preferred to use a mixture of 80% by weight of

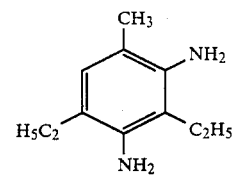

and 20% by weight of

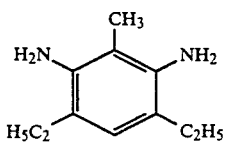

as the sterically hindered aromatic diamines.

It is also particularly preferred to use a mixture of 65% by weight of

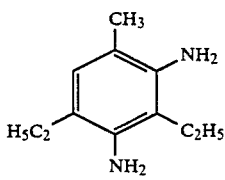

and 35% by weight of

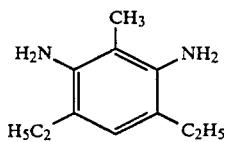

as the sterically hindered aromatic diamine.

The present invention is also directed to a process for the production of a spray polyurethane foam by spraying a reaction mixture comprising (i) an organic polyisocyanate, (ii) a compound containing at least two isocyanate reactive hydrogen atoms and having a molecular weight from 400 to 10,000, and (iii) water and/or an organic blowing agent, onto a substrate and allowing the reaction mixture to react and form a foam, the improvement wherein one or more of the aboveidentified sterically hindered aromatic diamines are added to the reaction mixture.

In one preferred embodiment of the invention, the diamines are added to the isocyanate-reactive component of the foamable reaction system.

The sterically hindered aromatic diamines are generally used in a quantity of from 0.5 to 6% by weight and preferably in a quantity of from 1.0 to 3.5% by weight, based on the isocyanate-reactive component.

The production of the aromatic diamines used in accordance with the invention is known per se.

The materials used for producing the free-rise and spray polyurethane foams are known in the art.

As starting components, aliphatic, cycloaliphatic, araliphatic, aromatic and heterocyclic polyisocyanates of the type described, for example, by W. Siefken in Justus Liebigs Annalen der Chemie, 562, pages 75 to 136, may be used. Examples include those corresponding to the following formula Q(NCO)

in which n=2-4, preferably 2, and

Q is an aliphatic hydrocarbon radical containing from 2 to 18 and preferably from 6 to 10 C-atoms, a cycloaliphatic hydrocarbon radical containing from 4 to 15 and preferably from 5 to 10 C-atoms an aromatic hydrocarbon radical containing from 6 to 15 and preferably from 6 to 13 C-atoms, or an araliphatic hydrocarbon radical containing from 8 to 15 and preferably from 8 to 13 C-atoms.

Examples also include those polyisocyanates which are described on pages 10-11 of German Offenlegungsschrift No. 2,832,253.

In general, it is particularly preferred to use the commercially available polyisocyanates, such as 2,4- and 2,6-tolylene diisocyanate and mixtures of these isomers ("TDI"): polyphenyl-polymethylene polyisocyanates of the type obtained by phosgenating anilineformaldehyde condensates ("crude MDI"): and polyisocyanates containing carbodiimide groups, urethane groups, allophanate groups, isocyanurate groups, urea groups or biuret groups ("modified polyisocyanates"). Particularly preferred are those modified polyisocyanates which are derived from 2,4- and/or 2,6-tolylene diisocyanate and from 4,4'- and/or 2,4'-diphenylmethane diisocyanate.

As further starting components, compounds containing at least two isocyanate-reactive hydrogen atoms and having molecular weights of generally from 400 to 10,000 ("isocyanate-reactive component") are used. In addition to compounds containing amino groups, thiol groups or carboxyl groups, such compounds are preferably compounds containing hydroxyl groups, more particularly compounds containing from 2 to 8 hydroxyl groups, especially those having molecular weights of from 1,000 to 8,000 and preferably from 2,000 to 4,000. Examples of such hydroxy containing materials are polyesters, polyethers, polythioethers, polyacetals, polycarbonates and polyester amides containing at least 2, generally from 2 to 8, but preferably from 2 to 4 hydroxyl groups, of the type known per se for the production of homogeneous and cellular polyurethanes and described, for example, in German Offenlegungsschrift No. 2,832,253, pages 11-18.

As optional starting components, compounds containing at least two isocyanate-reactive hydrogen atoms and having molecular weights of from 32 to 400 ("isocyanate-reactive component") are used. Such compounds include compounds containing hydroxyl groups and/or amino groups and/or thiol groups and/or carboxyl groups, preferably compounds containing hydroxyl groups and/or amino groups which are used as chain extenders or crosslinking agents. Where amino group-containing compounds are used they are not the sterically hindered diamines of the present invention. These compounds generally contain from 2 to 8 and preferably from 2 to 4 isocyanate-reactive hydrogen atoms. Examples of the compounds in question can be found on pages 19-20 of the German Offenlegungsschrift No. 2,832,253.

Water and/or readily organic blowing agents of the type generally known and used in the polyurethane art are also used herein.

Optionally, auxiliaries and additives may be added. Examples include (a) catalysts known per se, generally in quantities of up to 10% by weight, based on the "isocyanate-reactive component", (b) surface-active additives, such as emulsifiers and foam stabilizers, (c) reaction retarders, for example acid-reacting substances, such as hydrochloric acid or organic acid halides; cell regulators known per se, such as paraffins or fatty alcohols or dimethyl polysiloxanes; pigments or dyes and flame-proofing agents known per se, for example tris-chloroethyl phosphate, tricresyl phosphate;

stabilizers against the effects of ageing and weather, plasticizers and fungistatic and bacteriostatic agents and fillers, such as barium sulfate, kieselguhr, carbon black or whiting.

These auxiliaries and additives which may optionally be used are described, for example, in German Offenlegungsschrift No. 2,732,292, pages 21-24 and in Kunststoff-Handbuch, Vol. VII, by Vieweg and Höchtlen, Carl-Hanser-Verlag, Munich, 1966, for example on pages 103-113.

According to the invention, the reaction components are reacted by the one-shot process, the known prepolymer process or by the semiprepolymer process, in many cases using machines, for example of the type described in U.S. Pat. No. 2,764,565. Particulars of processing machines which may also be used in accordance with the invention are known and can be found in Vieweg and Höchtlen's Kunststoff-Handbuch, Vol. VII, Carl-Hanser-Verlag, Munich, 1966, for example on pages 121 to 205.

The one-shot process is preferred. It is particularly preferred to produce the polyurethane foams by the spraying process (production of so-called "spray foams").

According to the invention, the free-rise and spray polyurethane foams are produced at isocyanate indices of generally from 95 to 150 and preferably (particularly in the production of spray foams) from 110 to 135.

The polyurethane foams obtainable in accordance with the invention are used, for example, in beds and chairs, as insulating materials, but especially as spray foams, for example for roof insulation.

The invention is further illustrated, but is not intended to be limited by the following examples in which all parts and percentages are by weight unless otherwise specified.

EXAMPLES

A. (Comparison)

A polyol mixture for the production of spray foams consisting of
- 10.0% by weight of sugar/propylene glycol-propylene oxide polyether (OH number 380, containing 40% by weight of propylene glycol-PO-polyether),
- 28.5% by weight of ester of phthalic acid anhydride and ethylene glycol (OH number 270),
- 14.4% by weight of ethylene diamine-propylene oxidepolyether (OH number 630),
- 9.5% by weight of ethylene diamine-propylene oxidepolyether (OH number 470),
- 7.7% by weight of glycerol,
- 28.7% by weight of tris-chloroethyl phosphate,
- 1.0% by weight of silicone stabilizer (L 5420, a product of Union Carbide Co.),
- 0.2% by weight of water, is activated with 0.3% by weight (based on the polyol mixture) of a mixture of triethylamine and dibutyl tin dilaurate in a molar ratio of 1:1, expanded with 23% by weight (based on the polyol mixture) of monofluorotrichloromethane as blowing agent and allowed to foam with polymeric diphenylmethane diisocyanate (crude MDI; NCO-content 31% by weight; viscosity approx. 200 mPas/25° C.) using an injection machine which doses the components in a ratio by volume of 1:1.

The following observations were made:

(A1). When the foam is sprayed on asbestos cement at 20° C., its adhesion to the substrate is greater than its transverse tensile strength. The foam satisfies the requirements of Group B2 building materials as laid down in DIN 4102 and also the other requirements laid down in DIN 18159, Part 1, for spray foams.

(A2). When the foam is sprayed on asbestos cement at 5° C., it becomes "sandy" in appearance underneath and separates from the substrate.

(A3). Although it is possible to improve adhesion of the foam to the substrate after the addition of 4% by weight of Jeffamine ® D-2000 (a polyoxypropylene polyamine produced by Texaco) to the above-described polyol mixture and spraying on asbestos cement at 5° C., the foam no longer satisfies the requirements in Group B2 building materials as laid down in DIN 4102. The minimum requirements as laid down in DIN 18159, Part 1, are no longer fully satisfied either.

B. (Invention)

An addition of 2% by weight of a mixture of 80% by weight of 1-methyl-3,5-diethyl-2,4-diaminobenzene and 20% by weight of 1-methyl-3,5-diethyl-2,6-diaminobenzene to the polyol mixture described above enables the foam to be sprayed on asbestos cement at 5° C. with adhesion values equal to those described in (A1). The burning behavior and other properties of the foam are also as described in (A1).

C. (Invention)

An addition of 3% by weight of a mixture of 65% by weight of 1-methyl-3,5-diethyl-2,4-diaminobenzene and 35% by weight of 1-methyl-3,5-diethyl-2,6-diaminobenzene to the polyol mixture described above again enables the foam to be sprayed on asbestos cement at 5° C. with adhesion values, burning behavior and other foam properties equal to those described in (A1).

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

We claim:

1. In a process for the production of a free-rise polyurethane foam by reacting (i) an organic polyisocyanate and (ii) a compound containing at least two isocyanate-reactive hydrogen atoms and having a molecular weight of from 400 to 10,000, in the presence of (iii) water and/or an organic blowing agent, and allowing the reaction mixture to foam, the improvement wherein a sterically hindered aromatic diamine corresponding to the formula(e)

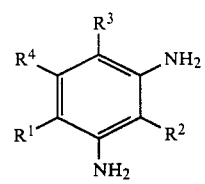

and/or

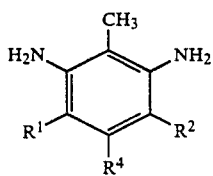

in which
R¹ R² may be the same or different and represent $C_1$-$C_4$ alkyl and R³ and R⁴ may again be the same or different and represent H or $CH_3$, is added to said reaction mixture.

2. The process of claim 1, characterized in that the sterically hindered aromatic diamine used corresponds to the following formula(e)

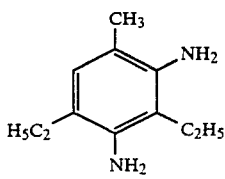

and/or

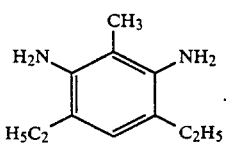

3. The process of claim 1, characterized in that a mixture of 80% by weight of

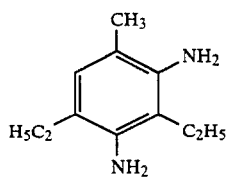

and 20% by weight of

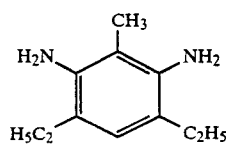

is used as the sterically hindered aromatic diamine.

4. The process of claim 1, characterized in that a mixture of 65% by weight of

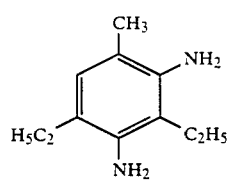

and 35% by weight of

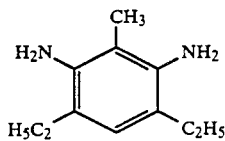

is used as the sterically hindered aromatic diamine.

5. The process of claim 1, characterized in that the diamine is added to component (ii).

6. The process of claim 1, characterized in that the sterically hindered aromatic diamines are used in a quantity of from 0.5 to 6% by weight, based on component (ii).

7. The process of claim 6, wherein the amount of said diamine is from 1.0 to 3.5% by weight.

8. In a process for the production of a spray polyurethane foam by spraying a reaction mixture comprising (i) an organic polyisocyanate, (ii) a compound containing at least two isocyanate-reactive hydrogen atoms and having a molecular weight of from 400 to 10,000, and (iii) water and/or an organic blowing agent onto a substrate and allowing the reaction mixture to react and form a foam, the improvement wherein a sterically hindered aromatic diamine corresponding to the formula(e)

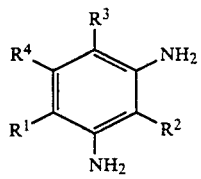

and/or

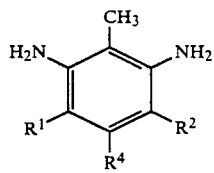

in which
R¹ and R² may be the same or different and represent $C_1$-$C_4$ alkyl and R³ and R⁴ may again be the same or different and represent H or $CH_3$, is added to said reaction mixture.

9. The process of claim 8, characterized in that the sterically hindered aromatic diamine used corresponds to the following formula(e)

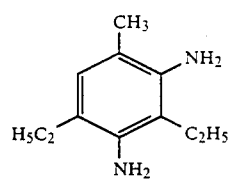

and/or

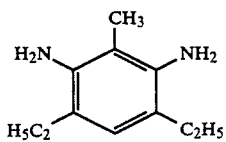

10. The process of claim 8, characterized in that a mixture of 80% by weight of

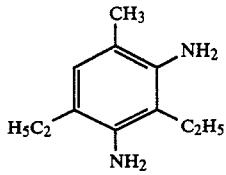

and 20% by weight of

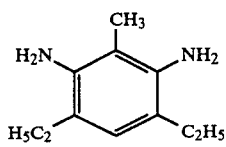

is used as the sterically hindered aromatic diamine.

11. The process of claim 8, characterized in that a mixture of 65% by weight of

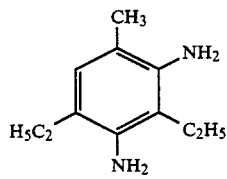

and 35% by weight of

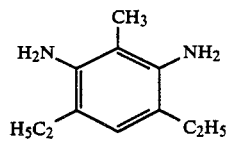

is used as the sterically hindered aromatic diamine.

12. The process of claim 8, characterized in that the diamine is added to component (ii).

13. The process of claim 8, characterized in that the sterically hindered aromatic diamines are used in a quantity of from 0.5 to 6% by weight, based on component (ii).

* * * * *

UNITED STATES PATENT AND TRADEMARK OFFICE
CERTIFICATE OF CORRECTION

PATENT NO. : 4,945,120

DATED : July 31, 1990

INVENTOR(S) : Richard Kopp et al

It is certified that error appears in the above-identified patent and that said Letters Patent is hereby corrected as shown below:

On the face of the patent the following should be added and/or corrected:

Please insert the city of residence for the inventors and delete "Bayer AG, D 5090, Leverkusen" so that the inventor section reads as follows:

--Inventors: Richard Kopp, Cologne; Gunter Oertel, Leverkusen; Eckehard Weigand, Roesrath; Rolf Wiedermann, Odenthal, all of Fed. Republic of Germany--

The description for the Related United States Application and the corresponding heading should be added as follows:

--Related U. S. Application Data
Continuation of Serial No. 06/771,539, August 30, 1985, abandoned--

The Attorney, Agent or Firm section has been omitted and should be added as follows:

--Attorney, Agent or Firm-Joseph C. Gil; Richard E. L. Henderson--

UNITED STATES PATENT AND TRADEMARK OFFICE
CERTIFICATE OF CORRECTION

PATENT NO. : 4,945,120

DATED : July 31, 1990

INVENTOR(S) : Richard Kopp et al

It is certified that error appears in the above-identified patent and that said Letters Patent is hereby corrected as shown below:

In the specification at column 3, line 38, please change "aboveidentified" to --above-identified--.

In the specification at column 5, line 12, please insert --by-- between the comma and the second "the".

In Claim 1 at column 7, line 11, please insert --and-- between $R^1$ and $R^2$.

Signed and Sealed this

Twenty-second Day of September, 1992

Attest:

DOUGLAS B. COMER

*Attesting Officer*  *Acting Commissioner of Patents and Trademarks*